(12) United States Patent
Barkelew et al.

(10) Patent No.: US 9,916,451 B2
(45) Date of Patent: Mar. 13, 2018

(54) INFORMATION HANDLING SYSTEM BOOT PRE-VALIDATION

(71) Applicant: Dell Products L.P., Round Rock, TX (US)

(72) Inventors: Jonathan B. Barkelew, Austin, TX (US); Kurt D. Gillespie, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/877,242

(22) Filed: Oct. 7, 2015

(65) Prior Publication Data
US 2016/0232356 A1    Aug. 11, 2016

Related U.S. Application Data

(60) Provisional application No. 62/113,758, filed on Feb. 9, 2015.

(51) Int. Cl.
*H04L 29/06* (2006.01)
*G06F 21/57* (2013.01)
*G06F 9/44* (2018.01)
*H04L 9/32* (2006.01)

(52) U.S. Cl.
CPC .......... *G06F 21/572* (2013.01); *G06F 9/4401* (2013.01); *G06F 21/575* (2013.01); *H04L 9/3268* (2013.01); *G06F 2221/031* (2013.01)

(58) Field of Classification Search
CPC .................................................. G06F 21/572
See application file for complete search history.

(56) References Cited

U.S. PATENT DOCUMENTS

| | | | |
|---|---|---|---|
| 9,246,690 B1* | 1/2016 | Roth | H04L 9/3268 |
| 9,589,139 B2* | 3/2017 | Bobzin | G06F 21/575 |
| 2004/0025010 A1* | 2/2004 | Azema | G06F 21/10 713/156 |
| 2008/0045342 A1* | 2/2008 | Crowder, Jr. | G06F 9/4403 463/42 |
| 2010/0017587 A1* | 1/2010 | Wiginton | G06F 21/57 713/1 |
| 2010/0169633 A1* | 7/2010 | Zimmer | G06F 21/575 713/2 |
| 2010/0185845 A1* | 7/2010 | Takayama | G06F 21/575 713/2 |

(Continued)

FOREIGN PATENT DOCUMENTS

EP    1429224 A1 *  6/2004 ............. G06F 21/10

*Primary Examiner* — Shawnchoy Rahman
(74) *Attorney, Agent, or Firm* — Terrile, Cannatti, Chambers & Holland, LLP; Robert W. Holland

(57) ABSTRACT

Pre-validation of bootloader certificates for firmware bootloaders of an operating system boot list during a setup mode of BIOS boot initiation provides the end user with a tool to address boot certification problems associated with the firmware bootloaders before the operating system boot precludes execution of bootloaders that lack a valid certificate. For example, re-configuration of a boot list to address certification problems before exit of boot setup prevents boot to an inoperative state caused by lack of firmware execution during boot due to a failed certificate, such as a failure to load an unsigned option ROM.

18 Claims, 3 Drawing Sheets

(56) References Cited

U.S. PATENT DOCUMENTS

| | | | | |
|---|---|---|---|---|
| 2012/0151223 A1* | 6/2012 | Conde Marques | G06F 21/6218 | 713/193 |
| 2014/0250291 A1* | 9/2014 | Adams | G06F 21/57 | 713/2 |
| 2015/0019850 A1* | 1/2015 | Rivera | G06F 21/572 | 713/1 |

* cited by examiner

| BOOT PREVALIDATION | | | |
|---|---|---|---|
| TRUSTED | STORAGE | | |
| UNKNOWN | GRAPHICS | PROCEED | Y / N |
| UNTRUSTED | I/OM | REPAIR | Y / N |
| BOOT SETUP INTERFACE | | | |

INFORMATION HANDLING SYSTEM BOOT PRE-VALIDATION

CROSS REFERENCE TO RELATED APPLICATIONS

This application claims the benefit under 35 U.S.C. § 119(e) of U.S. Provisional Application No. 62/113,758, filed Feb. 9, 2015, entitled "Information Handling System Boot Pre-Validation," which includes exemplary systems and methods and is incorporated by reference in its entirety.

BACKGROUND OF THE INVENTION

Field of the Invention

The present invention relates in general to the field of information handling system security, and more particularly to information handling system boot pre-validation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One concern that attaches to the use of all kinds of information handling systems is the vulnerability of information handling systems to malware or hacking attacks. Generally, malware is code snuck onto an information handling system that performs functions unauthorized by the end user. In some instances, malware creates a nuisance by interrupting an end user with advertisements or sending unauthorized "spam" from a user's email account. In other instances, malware has a more sinister intent, including capturing personal information of an end user, such as passwords and financial accounts. Malware can sit quietly monitoring an information handling system for extended periods of time, thus placing sensitive government classified information and enterprise trade secrets at risk. Undetected malware that exposes even minor personal information can create major risks for a government or enterprise if unauthorized users are able to leverage the personal information to access sensitive information, such as by guessing passwords.

To identify and remove malware, end users typically run anti-malware applications that search for and delete malicious code. Although conventional anti-malware applications have considerable success against known malicious code, sophisticated malware attacks are generally difficult to detect and defend against. In particular, malware that attaches to privileged administrator access of an information handling system's operating system often includes code that hides the malware from detection. Such malware, known as rootkit malware, uses administrator privileged access to modify anti-malware applications so that the rootkit malware escapes detection. Other types of malware attack code that is not normally monitored by anti-malware applications. For example, malware embedded in firmware, such as option ROM firmware, is not typically monitored or detected by anti-malware applications and often has direct access to sensitive hardware elements. Often, anti-malware applications that run over an operating system do not have access to firmware code and therefore cannot search for malware installed in firmware of embedded hardware devices. Generally, malware that runs in firmware or on embedded hardware devices has to be detected before installation of the malware on an information handling system.

One technique for preventing malware in firmware of embedded devices is to search firmware upgrades for malicious code before the firmware upgrades are installed. Although this technique detects known malicious code, unknown code may sneak past and remain installed even after the malicious code is identified as such. Another technique recently adopted for WINDOWS, known as Secure Boot, is to require that firmware code bootloaders have a signed key recognized by the operating system before the bootloaders are allowed to execute. A difficulty with the requirement for signed bootloaders is that unsigned or unrecognized firmware will not load at boot, thus leaving hardware devices inoperative, whether or not the firmware includes malicious code.

SUMMARY OF THE INVENTION

Therefore a need has arisen for a system and method which aids information handling system end users in managing information handling system secured boot of firmware.

In accordance with the present invention, a system and method are provided which substantially reduce the disadvantages and problems associated with previous systems and methods for managing information handling system boot of firmware by initiation firmware, such as a BIOS. Pre-validation of firmware is performed before operating system boot to detect firmware, such as option ROMs, that lack a valid signed certificate. If an invalid firmware certificate is detected, reconfiguration of bootloaders or BIOS settings remains available through a BIOS setup mode before operating system boot so that operating system boot will proceed normally.

More specifically, an information handling system has a hardware layer with processing components that cooperate to process information, a firmware layer with firmware instructions that run on the processing components, and an operating system layer that executes over the processing components and firmware to coordinate application use of information handling system resources, such as input, output, storage and network communications. The operating system includes a secure boot module that validates firmware bootloader certificates for bootloaders in a boot list before the firmware is allowed to execute. A pre-validation module in the firmware layer, such as in a BIOS, pre-validates firmware bootloaders before control passes to the operating system to execute the firmware bootloaders, such as by predicting firmware bootloaders that will fail to pass secure boot checks of the operating system after the BIOS transitions control of boot to the operating system. For example, the pre-validation module compares bootloader certificates in a boot list with known valid certificates to identify firmware bootloaders that will fail to pass secure boot checks by the operating system during normal boot. Firmware that lacks a valid certificate is presented to the end user during a BIOS-controlled boot setup mode so that the end user can perform a boot re-configuration action that will allow a normal operating system boot, such as skipping or replacing invalid firmware.

The present invention provides a number of important technical advantages. One example of an important technical advantage is that an end user is provided with a warning before boot takes place that one or more firmware elements are not authorized or otherwise might have difficulty during operating system boot. Pre-validation of firmware, such as option ROMs, before boot takes place allows the end user to intervene before the initiation of boot and correct an issue that impedes boot before a failed boot occurs, such as by presenting the end user with a BIOS boot setup menu. For example, if a storage subsystem option ROM lacks a signature by a recognized key, pre-validation identifies the potential failure of the storage subsystem before boot so that the end user may select a different boot device before the invalid device fails to load. In one embodiment, the end user is presented with icons that indicate firmware status, such as trusted, untrusted or missing, next to boot entries so that the end user has a clear indication of the status of firmware and risks of proceeding with a boot. In an alternative embodiment, instructions of the system BIOS allow the end user to address firmware status before initiation of boot, such as by reconfiguring bootloaders in a BIOS setup, to ensure that the information handling system boots to a usable state in light of known or predicted firmware issues.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Pre-validation of bootloader certificates for a boot list of an information handling system during BIOS setup reduces the risk that an information handling system will boot to a degraded state if a boot loader, such as for an option ROM, fails to load during operating system boot due to an invalid certificate. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
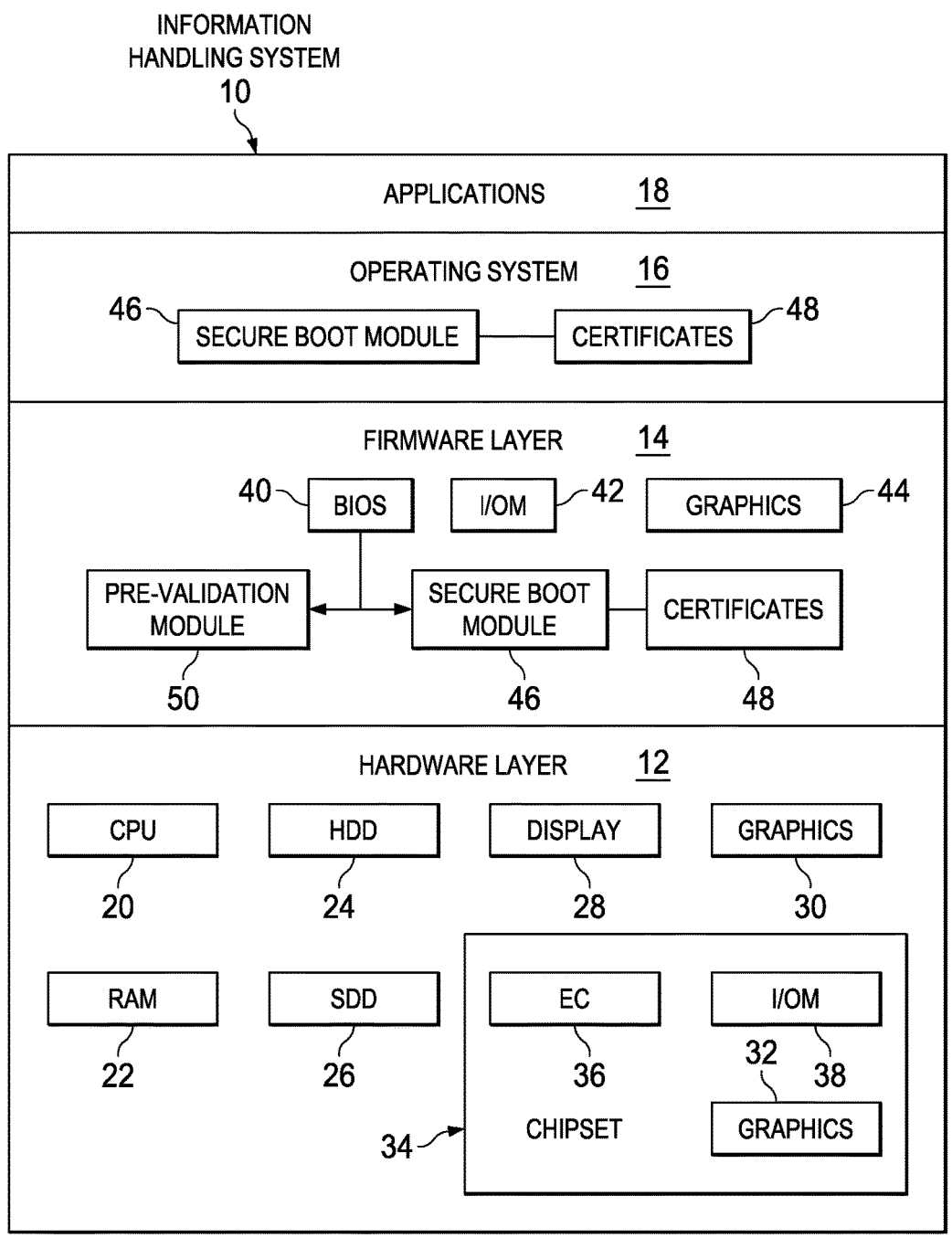
FIG. 1 depicts a block diagram of an information handling system configured to pre-validate bootloader certificates.

Referring now to FIG. 1, a block diagram depicts an information handling system 10 configured to pre-validate bootloader certificates. Information handling system 10 is depicted with a hardware layer 12, firmware layer 14, operating system layer 16 and application layer 18. Hardware layer 12 includes a variety of interfaced processing components that cooperate to process information. A central processing unit (CPU) 20 executes instructions to process information with the instructions and information stored in random access memory (RAM) 22. Persistent storage of information is provided by a hard disk drive (HDD) 24 and/or solid state drive (SSD) 26. A display 28 presents information as visual images, with the information turned into pixel-data by a graphics card 30, such as a daughter card, or a graphics system 32 included as a component with a chipset 34. Chipset 34 includes a variety of processing components that support processing functions. For example, an embedded controller 36 interfaces with a keyboard to accept end user inputs and provides system management functions, such as power management. As another example, an I/OM 38 coordinates inputs and outputs, such as Ethernet or wireless networking communications.

Firmware layer 14 includes instructions stored in persistent memory, such as flash memory available to components in chipset 34, which coordinate interactions between physical components in hardware layer 12. In the example embodiment, a Basic Input/Ouput System (BIOS), interfaces physical components with each other and acts as initiation firmware that "boots" hardware components from a powered down state to an operational state under the control of operating system 16. For example, BIOS 40 is firmware instructions that execute at least in part on embedded controller 36 to manage power to the processing components and to manage communication of inputs and outputs for end users. Other types of firmware in firmware layer 14 include option ROMs that manage specific devices. For example, an I/OM option ROM manages inputs and outputs through specific devices. As another example, a graphics option ROM 44 manages presentation of information by graphics device 30. Other types of firmware and option ROMs may be included in firmware layer 14 as needed to manage specific hardware devices, such as storage devices, networking device, etc. . . . Generally, the option ROM firmware instructions execute on the hardware component managed by the option ROM and interact with drivers included in operating system 16. Operating system 16 executes over hardware layer 12 and firmware layer 14 to support interactions by applications 18 with resources of information handling system 10.

In the example embodiment, information handling system 10 is brought to an operational state by retrieving operating system 16 from persistent memory to RAM 22 for execution on CPU 20 in a process known as bootstrapping or boot.

BIOS 40 initiates boot at power up of embedded controller 36 with instructions stored in persistent memory, such as flash memory of the embedded controller that locates operating system 16 in hard disk drive 24. BIOS 40 executes a startup routine for execution to bring the information handling system to an operational state with an eventual a transition from BIOS control of information handling system 10 to operating system control, such as at an "exit from boot services" provided by BIOS 40. After exit from boot services, operating system 16 performs a security routine to ensure that malicious code is not present in firmware stored or running on processing components of the information handling system. For example, a secure boot module 46 in the operating system compares certificates 48 stored on the operating system that are associated with valid firmware bootloaders and certificates stored in firmware layer 14 for firmware bootloaders in a boot list to be executed by operating system 16. If a firmware bootloader in the boot list does not have a valid certificate, then secure boot module 46 precludes execution of the firmware bootloader. As an example, secure boot module 46 operates in conformance with the Unified Extensible Firmware Interface (UEFI) Secure Boot specification.

Although secure boot module 46 prevents malicious or unauthorized firmware from loading during boot, the failure to load firmware may result in processing component failure. For example, if a graphics option ROM has an invalid signature certificate, the option ROM will not load and the display may not operate after boot completes. Similarly, if a storage device bootloader lacks a valid signed certificate, the option ROM for the storage device may not load, making the storage device unusable. Further, once BIOS 40 hands off control of boot to operating system 16, the end user loses control of how the boot sequence takes place so that an invalid certificate may cause a boot failure that the end user cannot immediately correct. In order to reduce the risk of boot to an inoperative state, firmware layer 14 includes a pre-validation module 50 that compares firmware certificates with valid certificates to validate the firmware before transition from control by BIOS 40 to operating system 16, such as while BIOS 40 is in a setup mode. In the example embodiment, firmware layer 14 includes a secure boot module 46 and certificates 48 to allow a comparison of option ROM and other firmware certificates with valid certificates so that the results of the comparison are available to pre-validation module 50 while an end user is able to interact with BIOS 40, such as in a BIOS set-up mode of operation. If a firmware bootloader has an invalid certificate, pre-validation module 50 presents the invalid certificate to an end user to provide the end user with notice of a predicted difficulty with boot and to allow the end user to re-configure boot, such as by selecting alternative firmware or selecting an alternative hardware device with valid firmware. For instance, if a storage device option ROM has an invalid bootloader certificate, pre-validation module 50 presents an end user with an option to boot using a different storage device that has a valid certificate. In one alternative embodiment, pre-validation module 50 may attempt automated re-configuration of system boot, such as by downloading valid firmware to replace invalid firmware while in BIOS setup mode.

Figures 2, 3:
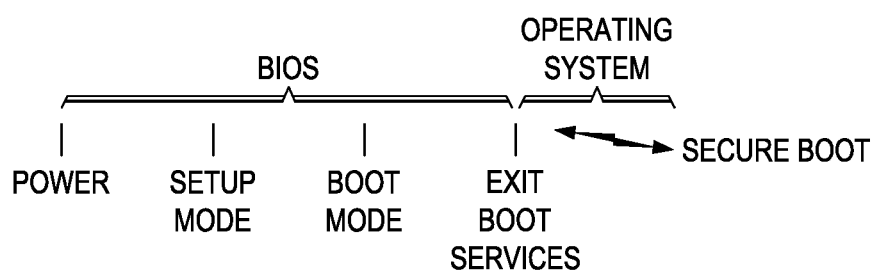
FIG. 2 depicts a user interface presented during boot setup to support end user interactions to correct bootloader certificate validation issues.
FIG. 3 depicts a timeline of an operating system boot with pre-validation of bootloader certificates.

Referring now to FIG. 2, a user interface is depicted as presented during boot setup to support end user interactions to re-configure bootloader certificate validation issues. In the example user interface, boot pre-validation results are presented for a storage device option ROM as trusted so that boot will proceed normally. However, a graphics option ROM has an unknown certificate, meaning that the certificate is not recognized but not associated with known malware; and an I/OM option ROM has an untrusted certificate, meaning that the certificate is associated with known malware. In general, the outcome of a secure boot check by the operating system is predicted by the pre-validation boot check of the BIOS so that, in some instance, the unknown indication may still pass secure boot. The user interface presents the user with an option to proceed or not proceed with a boot using the unknown graphics option ROM. The user interface presents the user with an option to re-configure or not re-configure the untrusted I/OM option ROM, however, the user is not allowed to proceed with a boot using the untrusted option ROM. The reconfigure option may include steps available to the end user in the BIOS setup mode or in a "safe" operating system mode entered from BIOS setup mode. For instance, the end user may use an alternative trusted I/OM option ROM, use an alternative I/OM device, attempt to retrieve a valid I/OM option ROM certificate, attempt to download an I/OM option ROM that has a valid option ROM, use an out-of-date option ROM that previously worked, such as with a saved configuration that predates the loading of the invalid option ROM, or use a network download or an external storage device that includes valid firmware. In one embodiment, automated repairs may be initiated by establishing a network interface with a known safe location that allows remote repairs of the information handling system firmware, such as a website of the information handling system manufacturer.

Referring now to FIG. 3, a timeline depicts an operating system boot with pre-validation of bootloader certificates. At application of power, firmware instructions execute to bring the information handling system to a BIOS set-up mode. For example, a BIOS set-up mode is typically established during boot and selected by an end user by pressing a function key. Pre-validation module 50 essentially initiates the function key to keep the information handling system in BIOS set-up if an invalid certificate is detected by pre-validation. During set-up mode, manual or automatic re-configurations may be made for invalid certificates so that the BIOS boot will not include a bootloader detected by pre-validation as having an invalid certificate. After exit of setup mode, boot mode prepares operating system instructions for execution and, at exit boot services the operating system takes control from the BIOS for bring the information handling system to an operational state. The operating system performs a secure boot check substantially at or shortly after exit boot services to verify that bootloader certificates in a bootlist are valid. If a bootloader certificate is not valid, the operating system will continue with boot by skipping execution of invalid bootloaders. Pre-validation module 50 helps to reduce the risk that the resulting booted system will be unusable due to the operating system secure boot module's rejection of a bootloader certificate after exit boot services.

Figure 4:
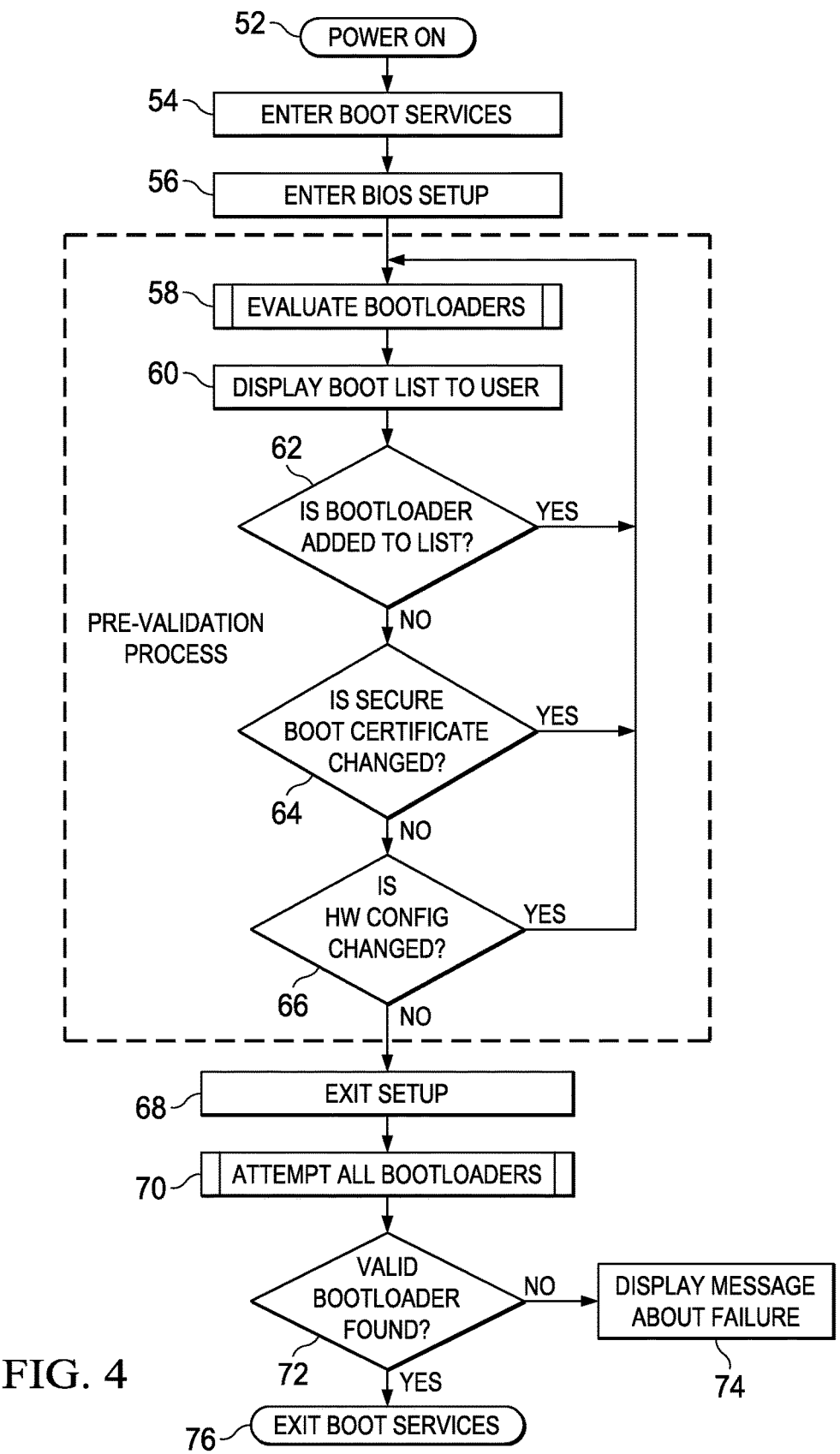
FIG. 4 depicts a flow diagram of pre-validation of bootloader certificates during information handling system boot.

Referring now to FIG. 4, a flow diagram depicts pre-validation of bootloader certificates during information handling system boot. The process starts at step 52 with system power on, such as by a power on self-test (POST), and then proceeds to step 54 to enter boot services. At step 56, the BIOS or other initiation firmware enters a setup mode in which an end user may adjust BIOS settings, such as by re-configuration of bootable devices. Steps 58 through 66 represent the pre-validation process performed by the pre-validation module while the BIOS remains in set-up mode. At step 58, while in setup mode, a boot list of bootloaders called during system boot is retrieved to the BIOS and evaluated to predicate certification errors that might arise with bootloaders in the list. At step 60, the boot list of bootloaders is presented to the user in the BIOS setup mode so that the end user may adjust boot configuration if desired. At step 62, a determination is made of whether the end user has added a bootloader to the boot list. If yes, the process returns to step 58 to evaluate bootloaders another iteration. If no, the process continues to step 64 to determine if a secure boot certificate has changed with respect to the bootloaders in the boot list, such as might happen if an end user has performed an option ROM update or other firmware patch. By tracking successful boots based on existing bootloader certificates, the pre-validation module is able to predict that the previously-booted option ROMs will pass the operating systems secure boot protocols. If at step 64 a secure boot certificate has changed since the most recent boot, the process returns to step 58 to evaluate bootloaders for another iteration. If the secure boot certificates have not changed, the process continues to step 66 to determine if the hardware configuration has changed, such as with the addition of a daughter card or other processing component that may include firmware and an associate bootloader. If the hardware configuration has changed, the process returns to step 58 to evaluate bootloaders for another iteration. If the hardware configuration has not changed, the process continues to step 68 to exit boot setup and proceed with normal boot transition from BIOS control to operating system control. At step 70, the operating system attempts all bootloaders of the boot list, including validation of bootloader certificates by the secure boot module. At step 72, a determination is made of whether valid bootloaders were found by the operating system secure boot module. If yes, the process continues to step 76 to exit boot services. If an invalid bootloader is found, the process continues to step 74 to display a message to the end user regarding the bootloader failure.

Although the present invention has been described in detail, it should be understood that various changes, substitutions and alterations can be made hereto without departing from the spirit and scope of the invention as defined by the appended claims.

What is claimed is:

1. An information handling system comprising:
   a processor executing instructions that process information;
   memory interfaced with the processor, the memory storing the instructions and information;
   a display interfaced with the processor and presenting the information as visual images;
   plural components interfaced with the processor and performing functions with firmware instructions loaded at boot of an operating system on the processor;
   initiation firmware stored in the memory and initiating boot of the operating system at power on of the processor;
   a secure boot module associated with the initiation firmware and comparing bootloader certificates for bootloaders of firmware instructions for the plural components with valid certificates to validate the firmware instructions, the secure boot module further preventing execution of firmware that lacks a valid certificate; and
   a pre-validation module associated with the initiation firmware and performing a pre-validation by comparing the bootloader certificates with the valid certificates before the comparison performed by the secure boot module, presenting the pre-validation at the display during a setup routine of the initiation firmware, initiating transition to a boot mode of the initiation firmware if the bootloader certificates are valid, and initiating transition to a modified boot mode of the initiation firmware if the bootloader certificates are not valid, the modified boot mode launching a firmware update function of the operating system to update the invalid firmware.

2. The information handling system of claim 1 wherein the plural components comprise a graphics subsystem and the firmware instructions comprise an option ROM to execute on the graphics subsystem.

3. The information handling system of claim 2 wherein the pre-validation module presents an alternative graphics subsystem to use at boot instead of a graphics subsystem having an invalid certificate, the alternative graphics subsystem selectable by an end user for use in boot through the display.

4. The information handling system of claim 3 wherein the graphics system is a graphics card and the alternative graphics system is a chipset-based graphics system.

5. The information handling system of claim 1 wherein the pre-validation module performs pre-validation during an initiation firmware set-up state to accept end user setting inputs to the initiation firmware based upon the pre-validation.

6. The information handling system of claim 5 wherein the secure boot module validates firmware instructions for the plural components after completion of boot services performed by the initiation firmware.

7. The information handling system of claim 1 wherein the pre-validation module further:
   initiates transition to a boot mode of the initiation firmware if the bootloader certificates are valid; and
   establishes a network interface to update the bootloader certificates if the bootloader certificates are not valid.

8. The system of claim 1 wherein the firmware loaded on the components at boot of the information handling system comprises option ROMs.

9. A method for booting an information handling system, the method comprising:
   initiating firmware instructions to bring an operating system from persistent memory to an operational state;
   executing a set-up state of the firmware instructions, the set-up state accepting end user inputs;
   while in the set-up state, validating certificates of option ROM bootloaders in a boot list of the firmware; and
   applying corrective action for invalid certificates in the set-up state before transition to a boot state, the corrective actions including at least presenting invalid certificates at a display while in the set-up state, and accepting end user inputs in response to the presenting invalid certificates.

10. The method of claim 9 further comprising:
    transitioning to the boot state to prepare execution of the operating system;
    exiting the boot state to initiate execution of the operating system; and
    in response to exiting the boot state, validating the certificates of the option ROM bootloaders before executing the option ROM bootloaders.

11. The method of claim 9 wherein accepting end user inputs in response to the presenting invalid certificates further comprises accepting an end user selection of an alternative option ROM to execute instead of an option ROM having an invalid certificate.

12. The method of claim 9 wherein accepting end user inputs in response to the presenting invalid certificates further comprises accepting an end user selection of an alternative component to use on boot from a component having an invalid certificate.

13. The method of claim 12 wherein the component having an invalid certificate is a graphics card and the alternative component to use on boot is a chipset-based graphics system.

14. The method of claim 9 wherein accepting end user inputs in response to the presenting invalid certificates further comprises establishing a network interface to retrieve an option ROM having a valid certificate to replace the option ROM having the invalid certificate.

15. The method of claim 14 wherein accepting end user inputs in response to the presenting invalid certificates further comprises accepting an end user override of the invalid certificate to permit operating system use of the bootloader associated with the invalid certificate.

16. A system for booting an information handling system, the system comprising:
 non-transitory memory storing:
  an operating system having instructions that execute on a processor to coordinate execution of applications on the information handling system, the operating system having a secure boot mode that validates bootloader certificates and precludes execution of bootloaders that lack a valid bootloader certificate;
  initiation firmware having instructions that coordinate boot of the operating system, the initiation firmware having a setup mode, a boot mode and an exit boot services that transitions control of the information handling system from the initiation firmware to the operating system; and
 a pre-validation module having instructions that determine the validity of the bootloader certificates during the initiation firmware setup mode, present invalid bootloader certificates at a display while in the set-up state, and accept end user inputs in response to the presenting invalid certificates to alter the operating system boot based on the invalid bootloader certificates.

17. The system of claim 16 wherein the end user input comprises a change to a boot list of bootloaders to replace the invalid bootloader with a valid bootloader.

18. An information handling system comprising:
 a processor executing instructions that process information;
 memory interfaced with the processor, the memory storing the instructions and information;
 a display interfaced with the processor and presenting the information as visual images;
 plural components interfaced with the processor and performing functions with firmware instructions loaded at boot of an operating system on the processor;
 initiation firmware stored in the memory and initiating boot of the operating system at power on of the processor;
 a secure boot module associated with the initiation firmware and comparing bootloader certificates for bootloaders of firmware instructions for the plural components with valid certificates to validate the firmware instructions, the secure boot module further preventing execution of firmware that lacks a valid certificate; and
 a pre-validation module associated with the initiation firmware and performing a pre-validation by comparing the bootloader certificates with the valid certificates before the comparison performed by the secure boot module, presenting the pre-validation at the display during a setup routine of the initiation firmware;
 wherein the plural components comprise a graphics subsystem and the firmware instructions comprise an option ROM to execute on the graphics subsystem; and
 wherein the pre-validation module presents an alternative graphics subsystem to use at boot instead of a graphics subsystem having an invalid certificate, the alternative graphics subsystem selectable by an end user for use in boot through the display.

* * * * *